US007751991B2

(12) United States Patent
Diezel et al.

(10) Patent No.: US 7,751,991 B2
(45) Date of Patent: Jul. 6, 2010

(54) SYSTEM FOR DETERMINING THE WEAR STATE OF A MACHINE TOOL

(75) Inventors: Matthias Diezel, Nürnberg (DE); Carsten Hamm, Erlangen (DE); Marc Holz, Erlangen (DE); David Koch, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/223,753

(22) PCT Filed: Dec. 28, 2006

(86) PCT No.: PCT/EP2006/070235

§ 371 (c)(1),
(2), (4) Date: Aug. 6, 2008

(87) PCT Pub. No.: WO2007/090486

PCT Pub. Date: Aug. 16, 2007

(65) Prior Publication Data

US 2009/0018781 A1   Jan. 15, 2009

(30) Foreign Application Priority Data

Feb. 10, 2006   (DE) .................. 10 2006 006 273

(51) Int. Cl.
*G06F 19/00* (2006.01)

(52) U.S. Cl. .................. 702/34; 702/33; 700/175

(58) Field of Classification Search .................. 702/34, 702/33, 119; 700/96, 173–175, 177, 182
See application file for complete search history.

(56) References Cited

U.S. PATENT DOCUMENTS 6,975,913 B2   12/2005   Kreidler et al.

FOREIGN PATENT DOCUMENTS

| DE | 101 52 765 A1 | 5/2003 |
| EP | 0 813 130 A2 | 12/1997 |
| EP | 1 027 954 A1 | 8/2000 |
| EP | 1 043 118 A1 | 10/2000 |

OTHER PUBLICATIONS

Zabel, A et al.; "Einsatzfelder der mehrachsigen Frässimulation"; wt Werkstattstechnik online, Vintage 95 (2005) Issue 1 / 2, pp. 56-61.
Denkena, B. et al.; "Simulationsmodul für Maschinendynamik im Rahmen eines Fertigungssimulationssystems"; wt Werkstattstechnik online, Vintage 92 (2002), pp. 223-225.
Inui, M et al.; "Fast visualization of NC milling result using graphics acceleration hardware"; Proceedings of the 2000 IEEE International Conference on Robotics and Automation, San Francisco, CA, USA, 2000, pp. 3089-3094, vol. 4, ISBN 0-7803-5886-4.

*Primary Examiner*—Drew A Dunn
*Assistant Examiner*—Hien X Vo

(57) ABSTRACT

The invention relates to a system for determining the wear state of a machine tool. It has a machine tool with a controller, a production control computer and the tool database via a respective data connection. A simulation computer, by way of a simulation process, while taking into account actual machine, production and tool data of the machine tool, is provided for determining data describing the wear state of the machine tool and for feeding said data to a display unit or a further process via a data connection.

8 Claims, 1 Drawing Sheet

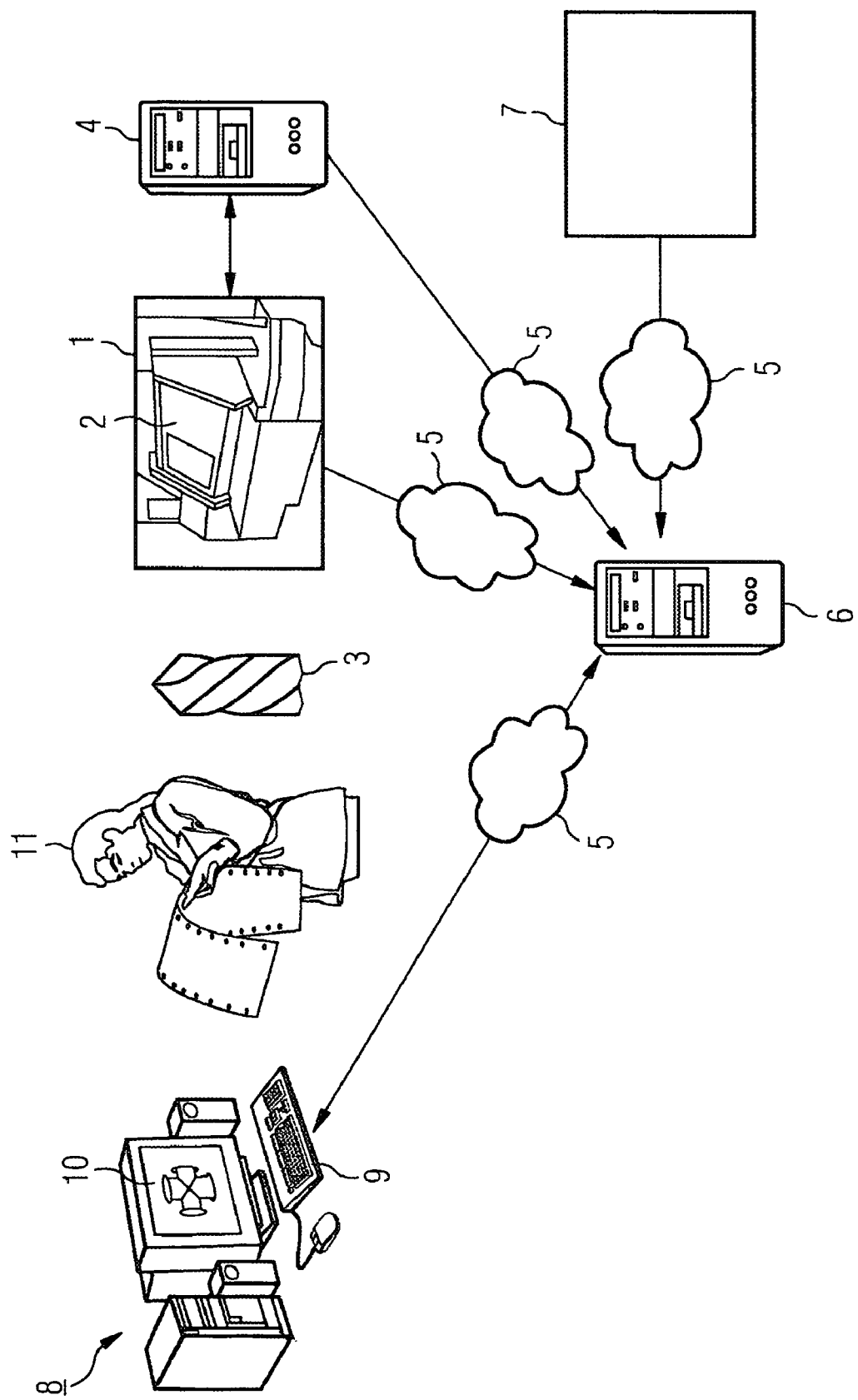

SYSTEM FOR DETERMINING THE WEAR STATE OF A MACHINE TOOL

CROSS REFERENCE TO RELATED APPLICATIONS

This application is the US National Stage of International Application No. PCT/EP2006/070235, filed Jan. 28, 2006 and claims the benefit thereof. The International Application claims the benefits of German application No. 10 2006 006 273.6 filed Feb. 10, 2006, both of the applications are incorporated by reference herein in their entirety.

FIELD OF INVENTION

The invention relates to a system for determining the wear state of a machine tool.

BACKGROUND OF THE INVENTION

During the operation of a machine tool the tools used are subject to wear. The geometry of the tool changes, depending on the type of load and the machining method, such as for example turning, milling or boring. This change impacts on the workpiece to be manufactured using the machine tool. Up to a certain level this change in the geometry of the tool can be compensated for by the machine tool controller with the aid of compensating algorithms. In this process the current tool geometry is detected and the machining process is changed as a function of the measured wear offset.

One example of this is a milling head shortened by wear. In such an instance the machine tool controller modifies the tool correction data, so that the center of the tool is positioned precisely at the point required in each instance during machining.

However the machine tool controller is only able to compensate for such tool wear to a limited extent. It is thus not possible to modify the general pattern of the milling paths, which is predetermined by the program of the numerical controller present in each instance. This means that despite a tool correction carried out by means of the machine tool controller the workpiece to be manufactured deviates from its setpoint geometry due to a change in the cutter diameter or the contour of the milling head due to wear.

To maintain the quality of the workpieces to be manufactured and at the same time to keep the costs of new tools as low as possible, it is desirable to identify the most favorable time for replacing the tool.

It is already known for this purpose that fixed wear variables can be specified. These values are generally based on values from the user's experience.

The machining process can also be simulated with a modified tool geometry. A number of NC validation tools are known for this purpose, which also permit an inputting of modified tool geometries, for example Vericut, Unigraphics-NX and Tecnomatix. This inputting and the updating of the various simulation parameters and the models to be simulated are effected manually and therefore require a high level of outlay.

SUMMARY OF INVENTION

The object of the invention is to specify a system for determining the wear state of a machine tool, with which data, which describes the machine tool and its tools as precisely as possible, can be supplied quickly and simply.

This object is achieved by a system with the features specified in the claims. Advantageous embodiments and developments of the invention are specified in the dependent claims.

According to the present invention a system is provided, with which the data required for the simulation process is real machine, manufacturing and tool data, which is obtained online from the components involved by way of data connections, in particular the internet or an intranet. This data is transmitted to the simulation computer. A simulation based closely on reality is carried out there to determine data describing the wear state of the machine tool.

The data describing the wear state is fed by way of a data connection to a display unit and displayed there. It can be viewed there for example by a production manager, who then makes the decision whether a tool should be replaced or whether a tool replacement can still be deferred. Alternatively or additionally the data describing the wear state can also be transmitted to a further process, for example a tool management process.

In practice the machine tool, the tool producer and often also the simulation computer are locationally a long distance away from one another. The problems associated with this can advantageously be resolved in that said components are connected to one another by way of the internet or an intranet.

If the display unit, on which the data describing the wear state of the machine tool is displayed, is part of a computer, a request signal can be input at any time by way of the computer keyboard, as a result of which the data describing the wear state of the machine tool is transferred and/or displayed. If the simulation computer and the said computer are positioned locationally a long distance away from one another, they are advantageously connected to one another by way of the internet or an intranet.

If the tool database, as specified in the claims, is located on the premises of the tool producer, time-consuming updating of a tool database in the production control computer is advantageously not necessary.

Further advantages of the invention consist in that the data required for the simulation process can be obtained in a time-saving manner from the real process. Also it is possible to use the simulation to register, analyze and visualize how major the inaccuracy or difference in the tool wear is and whether it is still within respectively predetermined tolerances. It is also possible with a system according to the invention to use a simulation to check whether an error in the geometry of a workpiece has actually been caused by a wearing or worn tool.

In particular a system according to the invention can be used to optimize the useful life of machine tools. This means better utilization of machines based on an ability to schedule maintenance work more precisely. The time when worn tools have to be replaced can be determined more precisely. This saves costs and ensures the quality of the tools produced.

BRIEF DESCRIPTION OF THE DRAWINGS

An exemplary embodiment of the invention is described below with reference to the FIGURE, which shows a diagram of a system for determining the wear state of a machine tool.

DETAILED DESCRIPTION OF INVENTION

The illustrated system has a machine tool 1, which contains a controller 2. The machine tool also has tools 3, which include for example a lathe, milling heads and boring tools. The machine tool 1 is connected to a production control computer 4, in which manufacturing data is available. This includes for example production schedules, maintenance data, information about machine models and NC programs.

The machine tool 1 is provided to produce workpieces, with said production being achieved using the tools of the machine tool.

During operation of the machine tool the tool is subject to wear. This wear causes the geometry of the tool to change. This change in geometry is compensated for to a certain degree by the controller 3 with the aid of compensating algorithms. However if the wear progresses, the changes in the geometry of the tool can no longer be compensated for by means of these compensating algorithms and the tool has to be replaced.

The illustrated system allows the time, when worn tools have to be replaced, to be determined relatively precisely.

To this end a simulation computer 6 is provided, which is used to simulate the production process operating on the machine tool in a manner based closely on reality. This simulation takes place using controller emulation of the machine tool controller and a CAM system, which is able to map kinematic machine behavior precisely.

The simulation computer 6 is connected by way of data connections 5 to the production control computer 4, the controller 2 of the machine tool and a tool database 7. These data connections can be the internet or an intranet respectively.

Preferably at least the tool database 7 is located on the premises of the tool producer and connected to the simulation computer 6 by way of the internet.

This connection of the simulation computer 6 to the tool database 7 located on the premises of the tool producer allows the tool data required by the simulation computer for the simulation process to be called down online, for example by a web service provided by the tool producer. This maintenance data includes for example data relating to the setpoint geometry of the tools and data relating to the physical characteristics of the tools.

In the exemplary embodiment shown the simulation computer 6 is also arranged locationally at a distance from the production control computer 4 and the controller 2 of the machine tool and is connected to the said components by way of the internet.

The simulation computer calls down the manufacturing data it requires to carry out the simulation process online by way of the data connection 5 between the simulation computer 6 and the production control computer 4. This manufacturing data includes for example data relating to machine models, production schedules and NC programs.

The simulation computer calls down machine data relating to the machine tool it requires to carry out the simulation process online by way of the data connection 5 between the simulation computer 6 and the controller 2 of the machine tool. This machine data includes for example tool identification numbers and data relating to the newly dimensioned geometry of the tools.

The simulation computer 6 transmits the data fed to it into a model of the manufacturing process carried out by means of the machine tool 1 based closely on reality and carries out a simulation process, taking into account this real machine, manufacturing and tool data fed to it, in order to determine data describing the wear state of the machine tool.

This data describing the wear state is transmitted by way of a further data connection 5 to a computer 8, which has a keyboard 9 and a display unit 10, and is displayed on the display unit 10 of said computer. The data describing the wear state can be based for example on a differential volume calculation of the tool.

The data displayed on the display unit 10 helps an operator 11, for example a production manager, decide whether or not tool replacement is necessary.

The display unit 10 can also display data, which informs the operator of possible consequences of the continued use of the tool in the event of tool dimensioning.

With the described system it is also possible to use a simulation process to check whether a geometry error in a finished workpiece is actually caused by a worn or wearing tool.

In particular a system according to the invention allows the useful life of machine tools to be optimized. This has the advantage that the machine tools are better utilized, as maintenance work can be scheduled more precisely. The time when worn tools have to be replaced can be determined more exactly. This can save costs and ensure the quality of workpieces produced using the respective machine tool.

The simulation computer 6 is preferably able to carry out the entire simulation process automatically. This is done using a software API or an executive routine.

In one advantageous embodiment of the invention a request signal is input using the keyboard 9 of the computer. This request signal is transmitted to the simulation computer 6 by way of the data connection 5. In response to receipt of this request signal, said simulation computer 6 supplies the required data describing the wear state of the machine tool and transmits it by way of the bi-directional data connection 5 to the computer 8, on whose screen 10 it is displayed.

Ultimately the invention describes a system for determining the wear state of a machine tool, with which a simulation of the manufacturing process based closely on reality is carried out using a simulation computer. In this simulation the relevant simulation parameters are obtained online by way of data connections from the system components involved. These simulation parameters are transmitted to the simulation computer and simulated with the aid of a simulation environment based closely on reality. The results obtained are then transmitted to a computer and displayed on its display unit or transferred to a further process.

With a system according to the invention a number of simulation modules are preferably available, being combined by the simulation computer 6 as a function of the decision criteria required in each instance for a tool replacement to form a complete simulation software package. The following simulation modules are provided for example:

one module for simple abrasion simulation with a reconstruction of the tool paths at the workpiece with controller simulation one module for more precise simulation of the tool paths using an original controller software, one module for carrying out an additional simulation of the geometric machine behavior based on a kinematic simulation, one module for carrying out an additional simulation of the dynamic behavior of the drives and regulating circuits of the machine based on a dynamic simulation, one module for carrying out an additional simulation of the behavior of the machine structure in respect of the dynamics of said structure, for example with regard to deformation and heat generation.

These simulation modules can be combined in any manner to form a complete simulation software package, which satisfies the relevant requirements in each instance.

The invention claimed is:

1. A system for determining the wear state of a machine tool, comprising:

a machine tool having a controller;

a production control computer;

a tool database; and a simulation computer connected to the machine tool controller, the production control computer and the tool database via a respective data connection wherein the simulation computer determines data describing the wear state of the machine tool taking into account real machine manufacturing and tool data via a simulation process and feeds the determined data to a display unit or a further process via the data connection;

wherein the data connection is the internet or an intranet;

wherein the display unit is part of a computer and the transfer and/or display of the data describing the wear state takes place in response to the inputting of a request signal by means of an operating unit of the computer;

wherein the simulation computer carries-out the simulation process via a software API or an executive routine;

and wherein the simulation process carries out the simulation via a plurality of simulation modules, which are combined by the simulation computer to form a complete simulation software package wherein the plurality of simulation modules includes at least two of:

a module for simple abrasion simulation with a reconstruction of tool paths at a workpiece;

a module for carrying out a simulation of a geometric machine tool behavior based on a kinematic simulation;

a module for carrying out a simulation of a dynamic behavior of drives and regulating circuits of the machine tool based on a dynamic simulation; and a module for carrying out a simulation of the behavior of the machine tool structure in respect of dynamics of said structure.

2. The system as claimed in claim 1, wherein the tool database is located on the premises of a tool producer.

3. The system as claimed in claim 2, wherein the simulation transmits the data fed to it to a model of a manufacturing process carried out using the machine tool based closely on reality.

4. The system as claimed in claim 3, wherein the simulation computer carries-out the simulation process automatically.

5. The system as claimed in claim 1, wherein the data describing the wear state of the machine tool is based on a differential volume calculation for the tool used.

6. A system for determining the wear state of a machine tool, comprising:

a machine tool having a controller;

a production control computer;

a tool database; and a simulation computer connected to the machine tool controller, the production control computer and the tool database via a respective data connection wherein the simulation computer determines data describing the wear state of the machine tool taking into account real machine, manufacturing and tool data via a simulation process, and feeds the determined data to a display unit or a further process via the data connection;

wherein the data connection is the internet or an intranet;

wherein the display unit is part of a computer and the transfer and/or display of the data describing the wear state takes place in response to the inputting of a request signal by means of an operating unit of the computer;

wherein the simulation computer carries-out the simulation process via a software API or an executive routine;

and wherein the simulation process carries out the simulation via a plurality of simulation modules, which are combined by the simulation computer to form a complete simulation software package wherein the plurality of simulation modules includes:

a module for simple abrasion simulation with a reconstruction of tool paths at a workpiece;

a module for carrying out a simulation of a geometric machine tool behavior based on a kinematic simulation;

a module for carrying out a simulation of a dynamic behavior of drives and regulating circuits of the machine tool based on a dynamic simulation; and a module for carrying out a simulation of the behavior of the machine tool structure in respect of dynamics of said structure.

7. The system as claimed in claim 6, wherein the tool database is located on the premises of a tool producer.

8. The system as claimed in claim 6, wherein the data describing the wear state of the machine tool is based on a differential volume calculation for the tool used.

* * * * *